Patented Oct. 6, 1936

2,056,462

UNITED STATES PATENT OFFICE 2,056,462

MANUFACTURE OF MOLDED ARTICLES FROM UREA AND FORMALDEHYDE

Arthur M. Howald, Toledo, Ohio, assignor, by mesne assignments, to Plaskon Company, Incorporated, a corporation of Delaware No Drawing. Application September 24, 1934, Serial No. 745,291. In Canada February 11, 1929

14 Claims. (Cl. 18—55)

This invention relates to the manufacture of molded articles from urea and formaldehyde, and it comprises improved methods of making such articles wherein the hardening of the shaped composition in the mold is accelerated by new substances developed in situ from an inert component of the composition, and it also comprises improved molding compositions useful in such methods, said compositions comprising in addition to the fusible urea-formaldehyde reaction products a relatively inert compound capable of decomposing during the molding operation to produce new substances accelerating the hardening and setting of the shaped composition, said inert compound being ineffective until the composition is hot pressed; all as more fully hereinafter set forth and as claimed.

In making molded articles by hot pressing thermoplastic heat-hardening compositions, the requirements for production of commercially satisfactory articles are exacting. For one thing, the heating has two opposing functions, namely, to soften the composition so that it can be flowed and shaped by the pressure and rapidly harden the shaped composition so that it can be removed from the mold after a reasonable time. The actions must be successive, the softening being first. Only a limited amount of overlapping is permissible, otherwise imperfectly shaped, defective molded articles result. Much depends upon the inherent properties of the molding composition, particularly its behavior when heated.

While not all urea-formaldehyde reaction products are suitable for hot molding, urea-formaldehyde reaction products have been prepared which are sufficiently dry and fusible for hot molding. In certain copending applications Serial Nos. 280,949; 339,225; 363,412; 459,822; 446,044; 481,807; 484,718; 484,719; 494,693; 578,744; 595,230; 597,425; 621,758 and 720,912, I disclose various methods of making such urea-formaldehyde reaction products satisfactory in hot molding. Those urea-formaldehyde reaction products are converted into insoluble, infusible molded articles when hot pressed, that is, they are heat-hardening compositions.

I have now found that I can further improve their heat-setting properties and the stability of the molded articles by the present invention in which hardening is accelerated at the proper stage and time by quickly developing acidity at that time; the acidity being developed in situ under hot pressing conditions.

It has been proposed to add solid, dry, acid substances to dry molding powders so that during molding the softened mass will be quite acid and consequently will harden more quickly. The action of the acidity is, however, gradual and progressive; not sudden. Premature hardening is apt to occur and, apart from this, the accelerated hardening overlaps the softening action which should come first. Proper flow and shaping become difficult. Often the commercial molding powder cannot be consolidated by heat and pressure into a sound, dense molded article and in any event different batches are apt to work differently in molding. The alteration in any particular lot varies with the condition and time of storage. Usually molding powders are stored for varying times; which may be weeks or even months.

In the present invention there is added to the molding powder a substance substantially non-acid and inert under ordinary conditions, exerting no action during storage and handling but under the conditions of hot pressing developing an accelerator in situ and at the proper time, that is, after the softening and shaping are started. The molding powder composition is stable during storage over long periods of time; it is, so to speak, time stable. The heat applied to this composition in molding first causes a plasticization of the composition and then develops the acid. The desirable segregation of the actions occurring in the mold is easily obtained.

In commercial practice temperatures between 120° C. and 160° C. and pressures between 1000 and 8000 pounds per square inch are generally used in molding dry fusible powders containing urea-formaldehyde reaction products. In the present invention, inert substances are added which rapidly produce acid at temperatures between 100° C. and 120° C. The added substances should be stable up to about 80° C. They should be substantially non-acid and non-reactive with the urea-formaldehyde reaction products. Substances which, in addition to having the above mentioned property of liberating acid under molding conditions, have the following characteristics are advantageous: (1) a substantially neutral reaction, (2) a colorless appearance, (3) solubility in alcohol or water or both and (4) solidity at ordinary temperatures.

The use of a solution of accelerant is convenient in working with aqueous solutions of formaldehyde-urea reaction products. However, insoluble accelerants may be used, being physically mixed with the molding powder by any suitable means. For instance, the molding powder and accelerant may be ground together provided the temperature during grinding is not permitted to approach the molding temperatures.

Any suitable urea-formaldehyde reaction product which is dry and fusible can be used in the present invention but the materials prepared in my copending applications are best.

In some of the prior applications additions to the molding powder of inert substances capable of generating acidity at the proper time during molding are disclosed. Beta-brom hydrocinnamic acid salts and iso-dibrom succinic anhydrid are advantageous. Use of those compounds is disclosed in my prior application Serial No. 280,949, of which the present application is a continuation in part; the present application being directed to the improvement in hot pressing wherein the hardening accelerator is developed de novo and in situ during hot pressing and broadly to the molding composition by which such improvement can be obtained. In that prior application I claim certain complete processes for making pressure-shaped, heat-hardened articles from urea and formaldehyde and also certain steps in the preparation of the molding compositions. The use of beta-brom hydrocinnamic acid as a latent catalyst is likewise there claimed. In the present application the step of hot-molding the improved molding composition under pressure and the improved molding composition itself are generically claimed.

These compounds decompose rather suddenly at molding temperatures. Beta-brom hydrocinnamic acid decomposes at about 100° C. into HBr and styrene. (See page 255, Vol. II, Richter's Organic Chemistry, 1908 Edition.) Iso-dibrom succinic anhydrid decomposes at 100° C., breaking down into HBr and brom-maleic anhydride (ibid, page 451, Vol I). These compounds are substantially inert at temperatures below those used in hot pressing.

Another type of substance suitable for the present purposes includes the peroxides of certain aromatic acids such as benzoyl peroxide. Those peroxides thermally decompose to form aromatic acids and anhydrids which give the necessary acidity. With such compounds hardening is rapidly accelerated. Of course the peroxide selected is one which thermally decomposes within the range of molding temperatures employed but which is substantially stable and inert below molding temperatures. Said use of peroxides of aromatic type acids is disclosed in my copending application Serial No. 578,744. In that application I claim molding compositions containing benzoyl peroxid and like peroxides as the latent catalysts and the hot pressing of those compositions; this matter being a species of the present broad invention of this application.

The following examples, in which the parts are by weight, illustrate practical embodiments of the generic invention. They are merely illustrative rather than limitative of the invention. The essential limitations have been set forth ante.

Example 1

One mole of urea (carbamide) is mixed with aqueous formaldehyde (2 moles), concentrated ammonia solution (about ⅛ of a mole) and a small quantity of mineral base such as soda or carbonate of lime. The mixture is boiled until condensation of urea and formaldehyde takes place and the resultant solution is then evaporated to a thick syrupy consistency. During evaporation ammonia is lost but because of the small amount of mineral alkali still present, the condensation product does not gel.

If the solution thus obtained is dried at suitable temperatures, a dry fusible product is obtained. The dried product has an alkaline reaction, is rather freely fusible and is difficult to heat harden.

Before the solution so obtained is dried, it is cooled and the syrupy liquid is mixed with a suitable amount of beta-brom hydrocinnamic acid, which forms a neutral salt with bases present. The still alkaline mixture is then evaporated and dried in vacuum at a low temperature to complete dryness, powdered and molded, acidity being developed under the heat and pressure of molding.

In lieu of the beta-brom hydrocinnamic acid, other latent accelerators such as iso-dibrom succinic anhydrid may be used.

Fillers and other suitable ingredients may be compounded with this molding powder to vary the properties of the molded product as desired. Upon molding at about 140° C. and under pressures of about 2000 pounds, satisfactory molded articles are obtained in 2 minutes.

The above example illustrates improved methods of molding fusible urea-formaldehyde reaction products which otherwise are difficult to heat-harden. The following example illustrates a somewhat better practice wherein the fusible urea-formaldehyde reaction product is prepared in a slightly acid solution by controlled methods. There are certain advantages in such methods.

Example 2

2 parts of commercial formalin containing 37 per cent of formaldehyde by weight is adjusted to pH 6.4 by the addition of triethanolamine or other suitable base non-reactive with formaldehyde. To the partially neutralized formalin are added 1 part of urea. The molecular ratio of formaldehyde to urea is 1.5 : 1. The mixture may be slightly warmed to 25° C. to facilitate dissolving the urea and compensate for the chilling caused thereby.

The solution thus obtained is maintained at 25 to 28° C. for about 11 hours to secure smooth reaction and a substantially complete combination of formaldehyde and urea into an initial reaction product. Then the water and other volatiles are removed by evaporation at relatively low temperatures; at temperatures not exceeding 70° C. Any suitable method may be employed.

Usually the slightly acid solution of reactive product so obtained is mixed with absorbent filler to form a moist mass which is dried in a current of warm air until the dried mass is substantially free of volatiles, that is, capable of being hot pressed without vesiculation. In this particular embodiment about 200 parts of said solution are mixed with 70 to 80 parts of sulphite paper pulp and the moist mass dried in a tunnel drier with the drying air at between 40 to 70° C. Approximately 1 to 3 hours is required. The dried mass usually does not contain more than 3 per cent moisture. A dry fusible composition is obtained. It is ground to a powder in a suitable apparatus such as a ball mill. Impact grinding is advantageous. In grinding, the temperatures must not be permitted to unduly rise so as to affect the properties of the molding composition.

The powder is compounded with the latent hardening accelerator in about the proportion of 1000 parts of powder with 1 to 2 parts of latent accelerator. The latent accelerator may be added during the grinding step. Or it can be added later, at any time prior to molding. In this embodiment of the invention 0.1 part of beta-brom hydro cinnamic acid neutralized with hexamethylene tetramine are added to 100 parts of the dried material and the mixture ground in a ball mill, the temperature being maintained at below 30° C. The molding powder thus obtained can be molded at 140° C. under 2000 pounds per square inch pressure in about 1 minute to obtain a hard, shaped infusible product which is high-grade and stable. Other latent accelerators may be used in lieu of the beta-brom hydrocinnamic acid. For instance, 0.1–0.2 part of benzoyl peroxide may be substituted as the latent accelerator. With latent accelerators soluble in water or alcohol, a solution thereof may be added, in the proper proportion, to the solution of the urea-formaldehyde reaction product prior to the drying step. Upon drying, the improved molding composition is directly obtained. In the grinding step, the mixture is usually ground to a powder of flour-like character. For some purposes a granular powder or compacted blanks or pre-shaped slugs are advantageous. In such cases, these flour-like powders may be so processed as to convert them into a granular condition or into a compacted blank, etc. Such processing is disclosed in a copending application Serial No. 595,230. In such treatment the powder is usually heated to some extent. This is safe with these improved molding powders as they do not contain at that time the active accelerator. The presence of a substantially acid body would cause difficulty in such treatments.

Other compounds capable of generating acidity in the specified manner can be used. Among compounds suitable for the present purposes I may mention phenanthrene dibromide, dibrom hydrocinnamyl aldehyde and iso-dibrom succinic anilide, iso-dibrom succinic acid. Also salts of alkyl sulphuric acids may be used. All of these compounds liberate acid bodies by thermal decomposition at molding temperatures.

What I claim is:

1. A time stable dry, fusible molding composition stable in storage and prior to hot pressing, and capable of conversion into shaped articles under heat and pressure, said composition comprising a dry, fusible urea-formaldehyde condensation product intimately admixed with a small amount of a compound, itself inert in the dry molding composition, but which generates an acidic substance only at the temperatures of molding, said compound generating sufficient amount of acidic substance, de novo and in situ, for hardening at molding temperature, and remaining sufficiently inert in the dry molding composition at temperatures below molding temperature to render the composition stable in storage and to permit flow and shaping prior to acceleration of hardening.

2. As an improvement in the manufacture of hardened, shaped molded articles by hot pressing dry, fusible, urea-formaldehyde reaction products, the improvement which comprises accelerating the hardening with an accelerator developed, de novo and in situ, during hot pressing by the thermal decomposition of an added substance admixed with said reaction products and inert in the dry composition prior to hot pressing, the added inert substance decomposing only at molding temperature to produce said accelerator, being inert in the dry composition at ordinary temperature, and remaining ineffective at temperatures below 80° C., the heat and pressure applied to the dry molding composition being sufficient to effect the softening, flowing, shaping, development of accelerator, and hardening in that order.

3. The improved process of claim 2 wherein the inert substance so generating the accelerator at molding temperature is an organic compound thermally decomposing at temperatures between 90 and 130° C. to form a new, markedly acid compound, said organic compound generating sufficient new acidity in situ to harden the shaped composition at temperatures above 90° C.

4. The process of claim 2 wherein the accelerator so developed in situ is a strong mineral acid.

5. The process of claim 2 wherein the dry molding composition is slightly alkaline prior to hot pressing and wherein the shaped composition is acidified by an acid developed, de novo and in situ, during the hot pressing.

6. The process of claim 2 wherein the dry molding composition is slightly acid, the acidity thereof being insufficient to interfere with flow in the mold, and wherein the accelerator so developed during hot pressing is an acid substance which sufficiently increases the acidity of the shaped composition to rapidly harden the shaped composition and quickly resinify the urea-formaldehyde product to an insoluble, infusible condition.

7. In the manufacture of hot pressed resinified articles from dry materials including fusible, non-resinous, urea-formaldehyde reaction products, the improvement which comprises acidifying the material with an organic acid at a time subsequent to the application of heat and pressure while continuing the heat and pressure, said acidification being effected by means of an organic acid developed and generated, in situ and de novo, during the hot pressing.

8. As an improvement in the manufacture of molded articles by hot pressing dry, fusible reaction products of ureas with aldehydes, the improvement in accelerating hardening during hot molding which comprises developing and generating, in situ and de novo, an organic compound of markedly acid character capable of accelerating the said hardening, the softening, flowing, shaping, development of hardening accelerator and hardening occurring in that order and being effected in a single operation by the application of sufficient heat and pressure to the dry molding composition.

9. In resinifying non-resinous fusible urea-formaldehyde products by hot molding to form high grade products, the improvement which comprises subjecting such a product having formaldehyde combined with urea in molecular ratios not greater than 1.5:1 to heat and pressure in a state in which the acidity is not great enough to interfere with flow in the mold and after flow acidifying the material to accelerate resinification while continuing the heat and pressure, said acidification after flow being effected by means of a markedly acid compound developed and generated, in situ and de novo, during hot pressing.

10. An improved dry molding powder, stable in storage and at temperatures below molding temperature, and capable of being readily hot pressed into properly shaped, sound, dense, hardened molded articles, said powder comprising a dry mass of finely divided dry, fusible, urea-formaldehyde reaction product containing in admixture therewith, a small amount of a compound substantially inert in the dry powder at temperatures below molding temperature but thermally decomposing at molding temperature during hot pressing to form an acid, de novo in situ, capable of acidifying the composition and of accelerating hardening of the shaped article, the said inert compound decomposing at temperatures between 90° and 130° C. and so generating sufficient new acid to acidify and accelerate hardening of the shaped article.

11. The composition of claim 10 wherein the inert compound capable of generating new acid in situ is an organic compound liberating a strong acid by thermal decomposition and wherein between 0.1 and 0.2 parts by weight of such inert compound to 100 parts of said urea-formaldehyde reaction product is present in said molding powder.

12. An improved dry molding composition suitable for resinification by hot pressing, comprising a fusible non-resinous urea-formaldehyde condensation product and an organic compound substantially inert in the dry composition below molding temperature but decomposing during hot pressing to produce a new organic compound of markedly acid character.

13. In the manufacture of pressure-shaped, heat-hardened, molded articles from urea-formaldehyde products, the improvement which comprises hot pressing the dry molding powder of claim 10 under sufficient heat and pressure to effect softening, flowing, shaping, development of hardening accelerator and hardening in that order and to convert the dry fusible powder into shaped, insoluble, infusible molded articles containing stable heat-hardened urea-formaldehyde resins.

14. As an improvement in the manufacture of hot pressed resinified articles from dry urea-formaldehyde molding compositions, the steps which comprise admixing a dry fusible thermoplastic urea-formaldehyde condensation product with a dry solid substance, substantially inert in the mixture at ordinary temperature, but capable of thermally decomposing only at molding temperature to develop a new acid in situ during hot pressing, to form a molding composition, stable in storage and at temperatures below molding temperature, and then subsequently hot pressing the molding composition so obtained under sufficient heat and pressure to effect the softening, flowing, shaping, development of new acid in situ and hardening in that order in a single operation, said new acid being so developed in sufficient amount to quickly accelerate the hardening of the shaped urea-formaldehyde product.

ARTHUR M. HOWALD.